FIG. I

C. E. HENDEL, G. K. NOTTER,
M. E. LAZAR, W. F. TALBURT
INVENTORS

Nov. 21, 1961     C. E. HENDEL ET AL     3,009,817

PRODUCTION OF DEHYDRATED POTATO GRANULES

Filed March 16, 1960     3 Sheets-Sheet 2

C.E. HENDEL, G.K. NOTTER,
M.E. LAZAR, W.F. TALBURT
*INVENTORS*

BY R. Hoffman
*Attorney*

C.E. HENDEL, G.K. NOTTER,
M.E. LAZAR, W.F. TALBURT
INVENTORS

United States Patent Office 3,009,817
Patented Nov. 21, 1961

3,009,817
PRODUCTION OF DEHYDRATED POTATO GRANULES
Carl E. Hendel and George K. Notter, Berkeley, Melvin E. Lazar, Oakland, and William F. Talburt, Berkeley, Calif., assignors to the United States of America as represented by the Secretary of Agriculture
Filed Mar. 16, 1960, Ser. No. 15,511
5 Claims. (Cl. 99—207)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to improved processes for preparing dehydrated potato products, particularly dried potato granules, that is, pre-cooked mashed potatoes in dehydrated and granular form. A particular object of the invention is the provision of methods which yield potato granules of a quality not attainable by present commercial processes. Other objects of the invention include the provision of methods of producing potato granules more efficiently and effectively than by known procedures. Further objects and advantages of the invention will be evident from the following description taken in connection with the annexed drawing. Parts and percentages set forth herein are by weight unless otherwise specified.

Figure 1:
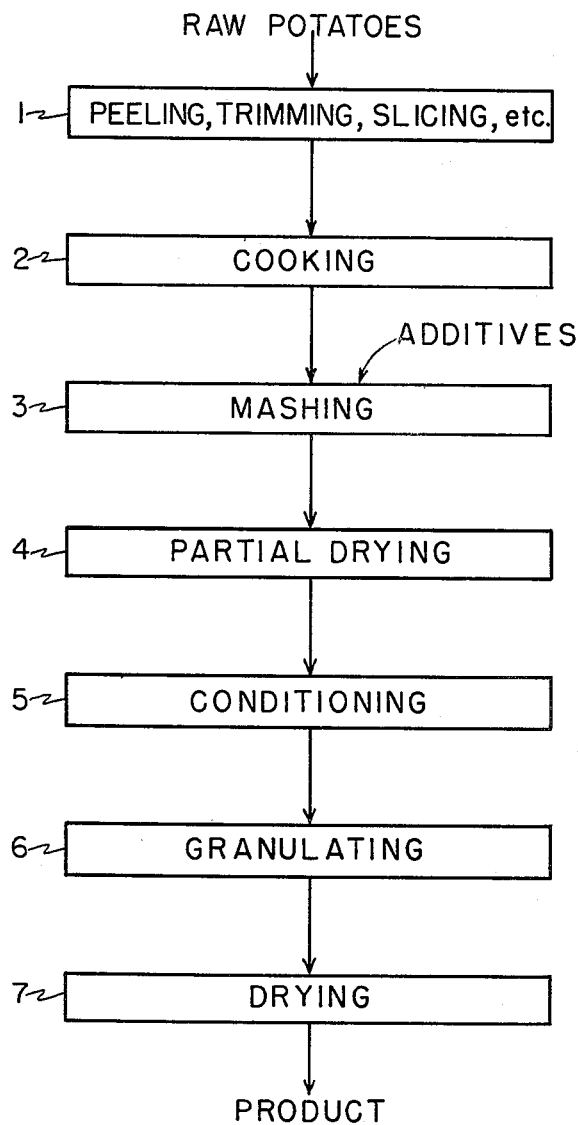
Figure 2:
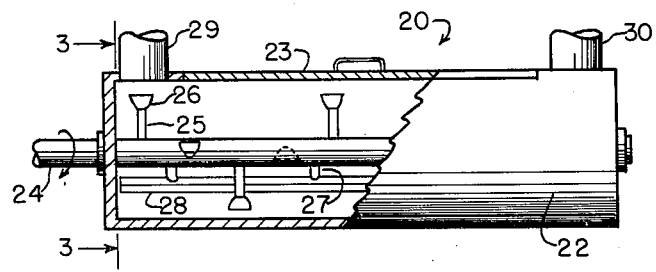
Figure 3:
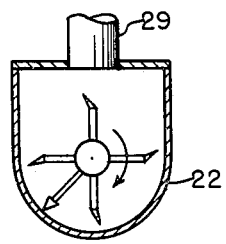
Figure 4:
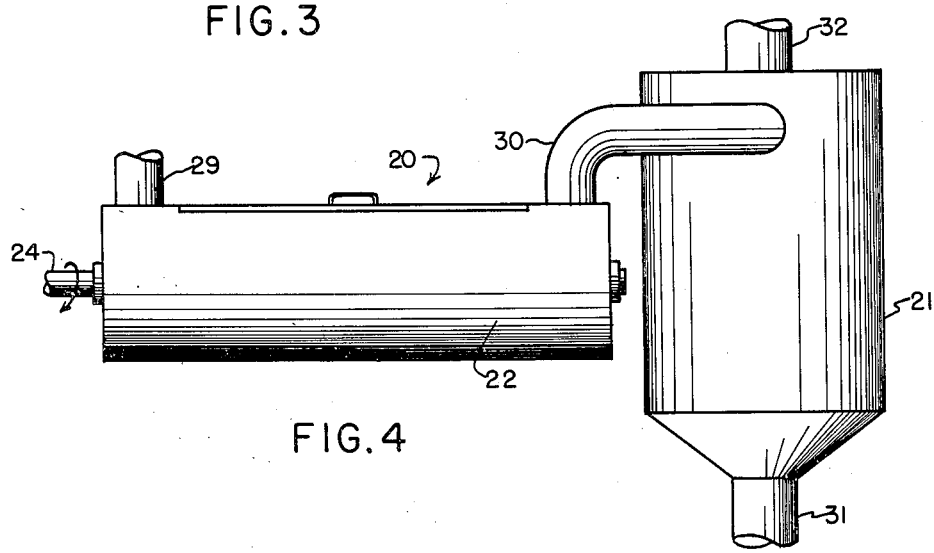
Figure 6:
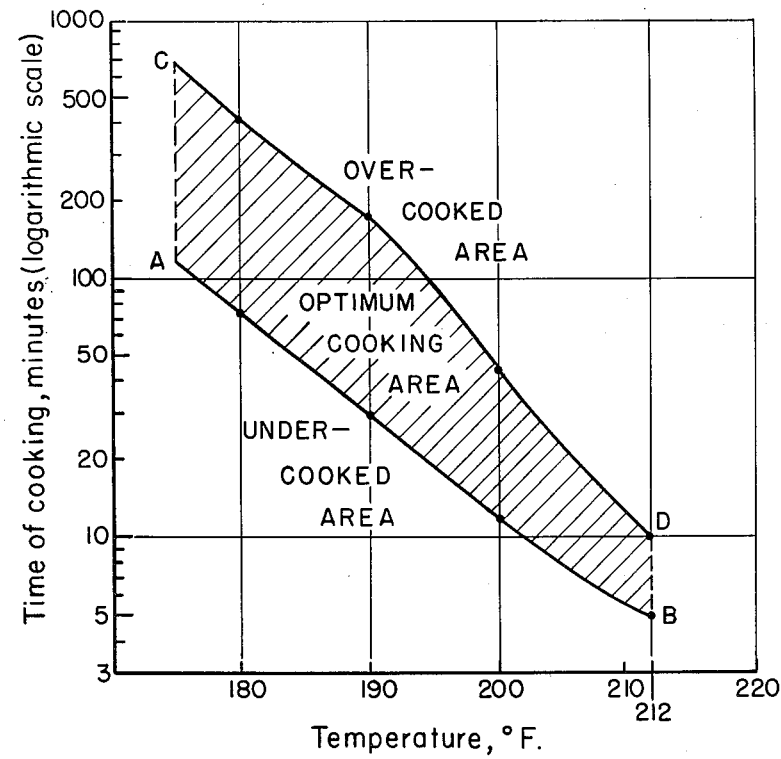
Figure 5:
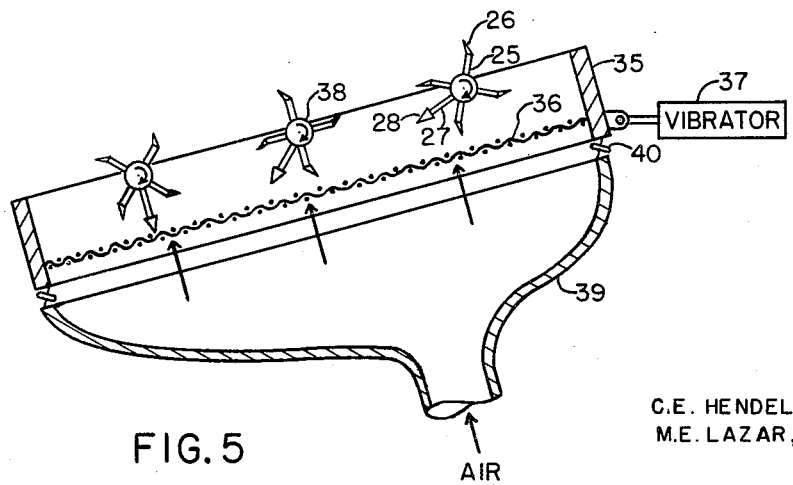

In the drawing, FIG. 1 is a schematic flow sheet illustrating procedures embodying the principles of the invention. FIG. 2 is a view, partly in cross-section, of the granulator device useful for carrying out various steps in the process including conditioning and drying as well as granulation. FIG. 3 is a cross-sectional end view taken on plane 3—3 of FIG. 2. FIG. 4 illustrates the granulator used in conjunction with a collector for recovering the dried product. FIG. 5 illustrates another form of apparatus for conditioning, granulating, drying, etc. FIG. 6 is a graph illustrating the preferred cooking conditions.

In producing dehydrated potato granules, it is always the aim to obtain a product which on mixing with water, rapidly forms a mashed potato dish of mealy texture comparable to freshly prepared mashed potatoes. This desideratum, however, is difficult of attainment in commercial operations. A foremost problem is that the reconstituted mash tends to be sticky and pasty instead of mealy. This undesirable effect is caused by a rupture of cells during processing whereby starch is released from the cells. It is the presence of this extracellular starch which gives the reconstituted product its pasty texture. Cell rupture is principally caused in the step or steps of the process wherein the potato material is subdivided. Thus, to produce a product which reconstitutes rapidly and which forms a mash on reconstitution, it is necessary that the dry product be in finely subdivided form. Accordingly, somewhere along the line it is necessary to reduce the potato tissue to particulate form. This is very difficult to do effectively. For example, if the potatoes are dried in the form of slices, slabs, or dice, then pulverized, the product is totally useless. Pulverization of the dried potato tissue causes such extensive cell damage that the product on addition of water forms an unpalatable paste. On the other hand, it is futile to subdivide the potato tissue early in the process when it is highly moist because the particles will stick together and dry as agglomerated lumps which will not reconstitute properly; they will form a lumpy unappetizing dish. Moreover, the product cannot be dehydrated uniformly—the lumps will tend to form horny crusts about the still-moist inner portions.

Various procedures have been advocated to attain the desired subdivision with a minimum of cell rupture. One procedure—known as the add-back process—is presently employed on an extensive scale in this country. The process involves these steps: Potatoes are peeled, sliced, cooked in steam, then mashed. The mashed potatoes are mixed with sufficient dried potato granules from a previous batch to give a moisture content of about 35% for the composite material. This material is conditioned by holding it at approximately 60 to 80° F. for an hour or more. The conditioned composite material is then dehydrated in a pneumatic drier to produce the dried granules. In this procedure the add-back operation (addition of previously dried granules to the mashed potatoes) is a critical step as it converts the sticky mashed potatoes into a moist powder which, after conditioning, can be dehydrated without agglomeration of the individual particles. Although the add-back process is widely used it presents many significant disadvantages, as explained below:

One disadvantage of add-back is that the dehydration equipment must handle about 6 to 10 times as much material as is actually packaged. To further explain—in order to reduce the moisture content of the mashed potatoes (originally 75–80%) to a level of about 35%, approximately equal weights of dried granules and mashed potatoes must be mixed. Then, when this composite product is dried, about 84–90% of it must be returned for recycling. It is thus obvious that only about one-tenth to one-sixth of the solid material being handled is product; the remainder stays in the system. Naturally, this means that the equipment must be several times as big as would be needed to handle a certain level of output and operating costs are correspondingly increased. Another point is that this continued recycling means that the product has been through the dehydrator about six to ten times. Obviously, any subjection of potato tissue to dehydrating operations will expose it to conditions of mechanical, heat, and oxidative damage and to expose it many times will multiply the amount of quality damage, particularly cell rupture caused by mechanical stresses such as abrasion. A third problem caused by this continued recycling is that the system is very inflexible and if a bad lot of material is produced it will take considerable production before the effect of this bad run is essentially eliminated. This is caused by the fact that the major proportion of the bad lot must be recycled with the result that each successive lot will contain a proportion of the bad material. Oftentimes it will take many hours of production to eliminate the effect of one bad lot. Naturally much thought has been given in the industry to schemes for eliminating the add-back step. However, despite much investigation and experimentation no practical process has been heretofore devised.

Thus, it has been advocated in the prior art that the problem of cell rupture during the subdivision step can be minimized by a conditioning step, involving a holding of the potato mash, preferably after partial dehydration, in a refrigerated state. Such procedure is shown for example, by Barker, British Patent No. 542,125 (1942). In this process, potatoes are peeled, washed, cooked, mashed, then partially dehydrated. The partially dehydrated mash is then chilled and held at such temperature for a period long enough to equilibrate the moisture content and toughen the cell walls. The conditioned mash is then pressed through a sieve while contacting it with heated air to form a moist powder which can be dehydrated without agglomeration of the individual particles.

The process outlined above offers the advantage that the add-back step is not used. However, the process involves certain disadvantages, explained as follows: For one thing, relatively long periods of conditioning the partly dried mash are advocated. This has the disadvantage that the potato material tends to become gray, develops off-flavors, and suffers a loss in vitamin content. Another point is that the step of forcing the conditioned mash through a sieve causes substantial cell rupture. Consequently the final product tends to form a pasty material when reconstituted. To avoid pastiness the product must be reconstituted with water at not over 80° C. (176° F.)—this produces a mashed potato dish in a relatively luke-warm state rather than piping hot as required in good practice.

There has also been proposed in the prior art processes which involve freezing cooked potatoes, and then subdividing the mass while frozen, into fine particles which are then dried. The subdivision is accomplished by a rubbing abrasive crushing, or milling action, typically by hammermilling the frozen potato material. This process, although it avoids the use of add-back, suffers from the disadvantage that the subdivision step causes extensive cell rupture whereby the product on reconstitution forms a pasty mass.

In accordance with the present invention the subdivision of the potato tissue is conducted under special conditions—described hereinafter—whereby many significant advantages are gained. A primary advantage is that the potato tissue is effectively granulated so that on drying it yields a product in the form of fine particles whereby the product can be rapidly reconstituted and directly forms a mash free from lumps or other unrehydrated particles. Moreover, these desirable results are attained without significant cell rupture so that the reconstituted product has a desired mealy texture, completely free from pastiness. As a consequence of these advantages the present invention enables the production of high quality potato granules without the use of add-back. In this application of the invention no add-back step is used with resulting saving in operating costs and increased efficiency and, moreover, the granule products are of excellent quality in that they reconstitute rapidly, forming mashed potatoes of a desirable mealy texture free from pastiness or lumps. Moreover, although it is preferred to apply the invention in the direct (no add-back) production of granules, it may be applied in the add-back process in order to effect certain significant advantages, these including elimination of conditioning or at least reduction in conditioning time and reduction in required proportion of recycled seed granules.

A principal features of the present invention is that subdivision is accomplished by subjecting the potato material to repeated mild compression and mild shear forces while drying the material through a critical moisture region as described below. The intensity of the mechanical forces is so controlled as to achieve effective separation of one cell from another rather than rupture of individual cells. As a net result the potato material is formed into fine particles so that the end product will reconstitute rapidly and directly forming mashed potatoes free from lumpy or gritty particles. Further, because cell rupture is kept at a minimum, the reconstituted product is free from pastiness. In preparing granules without add-back, this improved method of subdivision is preferably applied after the potatoes have been subjected to a series of steps usually including cooking, mashing, and partial drying. The subdivision step may be performed as a separate step or as part of other steps in the sequence of operations. Thus, for example, the potatoes may be cooked, mashed, partially-dried, conditioned by known methds, subdivided while drying through the critical moisture region in accordance with the invention, and given a final drying. More preferably, the conditioning step is carried out while also applying a part of the subdivision-partial drying treatment in accordance with the invention. In this way the time of conditioning is substantially reduced and the potato material is more readily reduced to fine, non-coherent particles. Another preferred plan is to apply the subdivision treatment of the invention during at least a part of the final drying stage as well as in an earlier stage. This has the benefit that the final product is in especially fine particle size and exhibits a high density—very important in reducing packaging costs of the final product. It is evident from the above that where the subdivision-partial drying step is applied in conjunction with another treatment, for example, conditioning or final drying, it loses its identity as a separate, individual step. This, of course, does not belie the significance of the subdivision.

For a complete understanding of how the principles of the invention are applied in practice, the following detailed description is provided:

Referring to FIG. 1 in the annexed drawing, in stage 1 the raw potatoes are subjected to the usual preliminary steps of washing, peeling, trimming, and slicing. The tubers are cut into slices which may range about from one-eighth to one inch or more in thickness. To preserve flavor and color, it is preferred to dip the slices in a sulphite solution prior to further treatment. Usually an aqueous solution containing about from 0.5 to 1.25% of sodium sulphite or bisulphite is used and the slices dipped therein for a few minutes. For example, slices a quarter inch thick are dipped one minute in a 0.5% sulphite solution while slices ¾" thick are dipped five minutes in a 1.25% sulphite solution. Usually the conditions of dipping are adjusted so that the slices contain about from 200 to 500 parts per million (p.p.m.) of $SO_2$ on a dry basis. Sulphiting may be applied at this stage as just described, but as an alternative it may be applied at a later stage, for example, after cooking and mashing. Another alternative is to apply part of the sulphite as described above and a further amount after cooking and mashing. Another alternative is to apply all or part of the sulphite by adding sulphur dioxide to the air or other gaseous medium applied to the potatoes during such steps as conditioning, granulating, drying, etc. Also, all or part of the sulphite may be applied in the soaking step described below.

As advantageous procedure which may be applied to the raw potato slices is to soak them in water to increase their moisture content. This has the desirable effect that the dehydrated products produced therefrom display an ability to absorb more water on reconstitution than otherwise would be the case. The procedure employed simply involves soaking the raw slices in water until their weight increases about 10% by absorption of water. Depending on such factors as piece size, variety of potato, etc., the soaking to attain this effect may require anywhere from one to four hours. The soaking step if employed is a useful point at which to impregnate the potato tissue with sulphite. Hence, the water may contain a small proportion, say 0.02 to 0.1% of sodium sulphite or bisulphite. This sulphiting procedure may be used instead of, or in conjunction with, sulphiting at other stages in the process.

In stage 2, the potato slices are cooked. This cooking step may be carried out as in conventional practice, for example, subjecting the sliced potatoes (about ¾" thick) to boiling water or steam at the same temperature (212° F.) for about 20–30 minutes. In a preferred method, the cooking is carried out under special conditions described in more detail in a subsequent section of this description.

In stage 3, the cooked potatoes—while hot—are mashed in conventional manner. This operation may be carried out by pressing the cooked potatoes between warm rolls, by pressing them through a screen, or by other conventional potato-mashing techniques. During or after mashing, various additives may be incorporated into the mash. Thus, to preserve color and flavor, a minor proportion of sodium sulphite or bisulphite may be added. Generally, enough sulphite is added to provide about 200 to 500 p.p.m. of $SO_2$ on a dry basis, including that incorporated in the previous sulphite dipping step or other sulphiting operation, where such are used. Minor proportions of fat-stabilizing antioxidants such as nordihydro guairetic acid, butylated hydroxy anisole, butylated hydroxy toluene, etc., may be added to prevent rancidification of the natural fat in the product on storage. To increase ability of the product to absorb moisture and to reduce stickiness, edible dispersing agents such as the monoglyceryl esters of long-chain fatty acids may be incorporated in the mash. Other substances which may be added are such food ingredients as salt, whole milk solids, non-fat milk solids, etc.

In stage 4, the mashed potatoes are partially dehydrated. This may be conveniently done with a double-drum drier. The mashed potatoes are fed into the nip between rotating, heated drums and the partially dried potato material is removed by scraper blades. The drier drums are generally heated to a temperature in the range about from 150 to 300° F. The temperature of the drums, the speed of rotation, and the thickness of the film of potato material are so correlated that the partially dried potato mash has a moisture content about from 50 to 75%, preferably about 60%. Although partial drying on heated drums is a preferred technique, it is not essential to use it. The vibrating screen dryer with rotating blades (FIG. 5) can be used, or other conventional dehydration procedures such as exposing thin layers or extruded portions of the mash to a current of hot air, vacuum dehydration techniques, and so forth, can be employed.

Following partial drying, the potato material in stage 5 is subjected to cooling and conditioning to eliminate its doughy texture and make it friable. In this stage the temperature of the mash is reduced to temperatures ranging from about 100° F. down to subfreezing. The conditioning may be effected in various ways. For example, the potato material may be held without mixing in closed containers in the presence of adventitious air or in the absence of air, that is, under vacuum or in an atmosphere of an inert gas such as nitrogen. Where the conditioning is at temperatures above freezing, the mash may be subjected to occasional or periodic fluffing or mixing during conditioning to minimize formation of aggregated masses that would subsequently be difficult to separate without rupture of cells. Thus, for instance, the potato mash may be carried on an elongated conveyor belt while it is subjected to the action of rotating paddles or similar devices which exert a gentle mixing or fluffing action to effect separation of the mass without rupture of individual cells. During the conditioning, the mash may be contacted with a current of air or an inert gas such as nitrogen to cool the product to temperatures from about 100° F. down to about 30° F. if conditioning is above freezing, or to freeze the product if conditioning is brought about by freezing. A minor proportion of sulphur dioxide may be added to the gas stream, particularly in the event that in previous steps the usual amount of sulfite is not added to the mash. In the preferred modification of the invention the conditioning is carried out by applying to the mash occasional or periodic mixing or fluffing while simultaneously contacting it with a stream of air. Under these conditions, and especially when the potatoes are cooked in the special way described above, the conditioning at above freezing temperatures is completed in a maximum of three hours and in many cases in one to two hours. More frequent mixing or fluffing is required when the mash is being cooled than at other times during the conditioning, because the hardening of the mass is accelerated by the evaporation of moisture from the product during cooling. The mixing or fluffing is a form of the mild compressive-mild shear action. It is important that the compressive portion of the forces be especially mild in the early stages of conditioning. Otherwise the material, which is somewhat cohesive in these early stages, will be agglomerated by the action, rather than separated, and longer time will be required for the material to become friable.

In stage 6, the conditioned material is granulated and dried through the critical moisture range. The granulation and drying are carried out either simultaneously or in closely successive operations repeated a number of times. (Where conditioning is carried out at subfreezing temperature, the mash is thawed before granulating.) In this granulating step the aim is to subdivide the mash into particles containing not more than about ten individual cells, preferably unicellular particles, and it must be done by separating one cell from one another rather than by rupturing individual cells. Were the latter to be done the product would yield a pasty, unpalatable mass on reconstitution. The granulation can be successfully accomplished by applying to the mass repeated mild compression and mild shear forces. Preferred methods by which this end can be attained are explained below in connection with FIGS. 2, 3, and 5. Any coarse potato material present after granulation may be recycled back to the conditioning step (stage 5).

In stage 7, the granulated potato material is further dehydrated to produce the dried granules. This final dehydration may be carried out in any manner as is conventional in the art. As an example, the potato material may be dehydrated by procedures incorporating the principle of fluidization. To this end, the potato material is placed in a vessel provided with means for jetting minute streams of hot air up through the bed of material tending to keep it in a fluidized state while being dried. Apparatus of this type and method of employing it to dehydrate moist potato particles are disclosed by Neel et al. (Food Technology, 1954, vol. VIII, pp. 230–234.) To further promote fluidization of the product in the early part of this drying operation, this fluidized-bed drier can be subjected to continuous vibration or shaking, or a mechanical agitator can be employed. In the alternative, the granulated potato material may be dehydrated in pneumatic-type driers, for instance, a device of the type disclosed by Olson et al. in Food Technology, vol. VII, pp. 177–181 (1953). This device consists essentially of a long, vertically positioned duct. Hot air at about 212–392° F. is forced upwardly at high velocity (i.e., about 1000 ft./min.) through the duct and the friable granulated potato material is fed into this air stream. As the current of air carries the material upward it is dehydrated. At the top of the duct is a conically diverging diffuser so that as the current rises into the diffuser its velocity is gradually diminished. A deflector is positioned above the diffuser whereby the now slowly moving current is deflected downward causing the dried potato granules to drop out of the air stream so that they can easily be separated from the moist exhaust air. In a preferred modification of the invention, the final dehydration is accomplished while the potato material is subjected to repeated mild compression and mild shear forces, as described below in connection with FIG. 4. In any event, after final drying the product has a moisture content of about 5 to 8%, preferably about 6%.

Reference is now made to FIGS. 2 and 3 which illustrate one modification of apparatus for effecting the granulation and drying through the critical moisture region. The apparatus, generally designated as 20, comprises a trough or U-shaped chamber 22 provided with a removable lid 23 and a longitudinal shaft 24. Suitable equipment, not illustrated, is provided to rotate shaft 24 in the direction shown at a low speed—about 1 to 5 r.p.m. Attached to shaft 24 are a series of arms 25, each bearing a paddle 26. Dimensions are so chosen that the tips of paddles 26 have a clearance on the order of ¼ to ½ inch from the cylindrical base of trough 22. Also positioned on shaft 24 are arms 27 which carry a blade 28 which extends essentially the length of trough 22. Blade 28 is made of flexible material such as silicone rubber (Silastic), neoprene, Teflon or other elastomer and is so positioned that its edge actually wipes against the cylindrical base of trough 22. This base may be provided with small protuberances, as by welding wires longitudinally along it, to increase the shearing effect to the desired level. An inlet conduit 29 is provided for introduction of gaseous media, for example, air for drying.

In using the illustrated device to granulate the potato material, conditioned potato mash—produced as above described—is introduced into trough 22. Shaft 24 is then caused to rotate and drying air is introduced through inlet conduit 29. The resulting action of paddles 26 and blade 28 effect the granulation of the potato material. Thus, paddles 26 cause a repeated mixing of the material and a disintegration of the larger aggregates of cells. Blade 28 being actually in contact with the cylindrical base of trough 22 effects a further size reduction of the particles. The reduction in particle size effected by the device is essentially limited to separation of individual cells one from another as contrasted with rupture of individual cells. Important in this regard is the fact that paddles 26 and blade 28 exert what may best be termed as mild compression and mild shear forces. Thus the mechanical forces exerted by these elements are of sufficient intensity to separate agglomerated cells but insufficient to rupture individual cells. The action is continued until the potato material forms a well-granulated mass of unicellular particles and small aggregates of unicellular particles that have only a very slight tendency to agglomerate together. Any agglomerates formed are very readily separated from one another. This is at the lower end of the critical moisture region where the potato material contains about 32 to 40% water, the precise moisture value depending somewhat on the previous history of the material. During the granulation, the potato material is contacted with a current of air, for example, at a temperature about from 75 to 200° F., to cause the desired reduction in moisture content during granulation. Ordinarily, the product remains at room temperature (about 75° F.) during the granulation. The warm air introduced does not appreciably raise the temperature of the potato material because of the cooling effect as water is evaporated therefrom.

Moreover, our researches have shown that there is an important relationship between the properties of the potato material, as regards granulation, and its moisture content. Knowledge of this relationship permits us to obtain significant advantages in the production of potato granules. It has been found that the granulation is most effectively accomplished while the moisture content of the potato material is reduced from about 50% down to about 35%, this range being herein designated as the critical moisture region. Thus, our researches have indicated that if the granulation is applied only at higher moisture levels (that is, above about 50%) the product retains so much cohesiveness that the particles will re-aggregate when subjected to subsequent operations. On the other hand, if the granulation is not effected until the moisture content of the mash is reduced to below 35%, the potato material is so horny that it cannot be subdivided without cell rupture. However, where the granulation is conducted while repeatedly applying the mild compression and mild shear forces and simultaneously contacting the mash with a draft of drying gas, this treatment being continued while the moisture content of the mash passes through the range from about 50% moisture down to about 35% moisture, the potato material is effectively granulated without cell rupture and the granulated product displays a minimum tendency to cohere in subsequent operations. In operating under this system, it is evident that there is at least a partial merging of stages 6 and 7 because in both of these stages there is granulation as well as drying.

The apparatus illustrated in FIGS. 2 and 3 can be employed for drying the potato material after it has been granulated and its moisture content has been reduced through the critical moisture region. To this end the granulator 20 is connected to a product-collection system as shown in FIG. 4. Referring to this figure, the exit conduit 30 is connected to collector 21. In operation, the dried product is carried by the current of air out of trough 22 into collector 21, the product dropping through discharge port 31 and excess drying air being released through vent 32. In drying in this way, the amount and temperature of the air introduced into the system via conduit 29 are increased above the levels used in the preceding stage. Thus, for example, the air temperature used is about from 150 to 250° F. The velocity of the air is increased so that the current is strong enough to carry out from trough 22 the fine dry particles. During the drying cycle, shaft 24 is rotated, as during the granulation, to maintain the potato material in a loose and bulky state and subdivide any larger particles found by re-aggregation of finer ones. During operation, the particles discharged from pipe 31 are examined and the velocity of the air stream adjusted so that essentially only the properly-dried, fine particles are carried by the air stream into the collector and the aggregated particles remain in chamber 22 for further drying and subdividing.

It is further evident that granulation and drying need not necessarily be carried out as separate and distinct steps. Thus, for example, the conditioned potato material may be introduced into trough 22 and shaft 24 started to rotate, this being continued throughout the process. At first, air at about room temperature is introduced into the system through conduit 29. Then as the operation continues the air temperature is gradually increased up to suitable temperatures for drying. Likewise, during the later stage of the process, the velocity of the air stream is likewise increased to entrain the dried fine particles and carry them out of the trough. Moreover, the trough granulator may be used for all three stages—conditioning, granulation, and drying. Thus, for example, the partially-dried hot mash is introduced into trough 22 and shaft 24 rotated either continuously or at intervals until the mash loses its doughy texture and becomes more friable. During conditioning, cooling may be applied as by contacting the mash with air at room temperature or below. After the potato material begins to lose its doughy texture, the shaft is rotated continuously, this being continued throughout the process, while the air temperature is gradually increased up to suitable temperatures for drying. Thereby the product is subjected to granulation and drying. Eventually, the velocity of the air stream is increased to entrain the fine dry particles and carry them out of the trough into the collector system.

In FIG. 5 is illustrated an alternative form of apparatus which may advantageously be utilized in the conditioning, granulating and drying steps. This apparatus includes a rectangular frame 35, supporting a screen 36. This screen is of fine mesh construction (80- to 150-mesh, for instance) to allow air to flow through but to prevent the potato material from passing through it. Frame 35 is connected to vibrator 37, of conventional construction, to vibrate the device. Journaled on frame 35 are a series of shafts 38 rotated in the direction shown by suitable equipment at moderate speed (about 50 to 150 r.p.m.). Secured to shafts 38 are arms 25 and 27, bearing paddles 26 and blades 28, as described in the modification of FIGS. 2 and 3. As in that modification, paddles 26 clear screen 36 by a distance of about ⅛ to ¼ inch whereas the soft, flexible, elastic blades 28 actually contact the screen. In using the device the potato material is placed on the screen 36 at the upper (right-hand) end and shafts 38 are rotated while the frame is vibrated. In small-scale construction the material arriving at the lower end of the screen may be collected and replaced at the higher end for continued action. On a larger scale the dimensions and the number of shafts and associated mechanisms are selected to properly treat the material in a single pass. The device, as that of FIGS. 2 and 3, may be employed in any of the stages of conditioning, granulating, drying, or any combination of them. Air for decreasing the moisture content of the potato material during treatment is forced upwardly through duct 39, connected to frame 35 via flexible coupling 40. Where the system is used for producing a dry product, a hood and collector of conventional design may be positioned above frame 35 for collecting the dried product.

As has been noted briefly above, the present invention may advantageously be applied in the manufacture of potato granules by the add-back process whereby to obtain significant advantages including (1) elimination or at least marked reduction in time of conditioning, (2) reduction in amount of "seed" which needs to be recycled, and (3) reduction in stickiness of the final product on reconstitution. These advantages result from the fact that with the new cooking procedure there is (1) substantially improved granulability of partially dried potatoes and (2) much improvement in texture of the final product. In applying the invention to the add-back process, potatoes are subjected to the preliminary steps (stage 1) and cooking. The cooked potatoes are then mashed and mixed with sufficient "seed" granules (that is, dried granules from a previous batch) to form a composite having a moisture content of about 32 to 35%. This composite material is then cooled to about room temperature preferably while applying repeated mild compression and mild shear forces as described above, using the granulator device of FIGS. 2 and 3 or that of FIG. 5. The material can then be dried directly—no conditioning step is required as in previous practice. Thus, in conventional practice the composite (freshly mashed potatoes plus seed granules) must be conditioned at room temperature for at least an hour. In an alternative method, the present invention may be used in the manufacture of potato granules by the add-back process to obtain a product of very fine texture (unusually low blue value), again without conditioning of the material before drying. (Elimination of the conditioning period is important as there is then much less opportunity for quality changes, by oxidation or other deteriorative reactions.) In applying this process the potatoes are treated as above described—preliminary steps (stage 1), cooking (stage 2), mashing (stage 3), and partial-drying (stage 4), then mixed with sufficient "seed" granules to give a moisture content of 30 to 40% for composite material. The composite material is mixed and cooled to room temperature, preferably while applying repeated mild compression and mild shear forces as described above, using the granulator device of FIGS. 2 and 3 or that of FIG. 5. The material is then directly dried—no conditioning period is needed.

Mention has been briefly made above regarding a special cooking technique. The conditions used and the advantages gained in this procedure are explained as follows:

Reference is made to FIG. 6 in which the preferred cooking conditions are shown graphically. In this figure, the minimum (curve AB) and the maximum (curve CD) cooking times corresponding to different cooking temperatures are plotted with the temperature on a linear scale and the time on a logarithmic scale. Thus, for example, if a cooking temperature of 180° F. is chosen, the time for cooking will be 75 to 420 minutes. Other conditions which may be used are: At 190° F., 30 to 180 minutes; at 200° F., 12 to 45 minutes; and at 212° F., 5 to 10 minutes. By operating within the area ABDC, several significant advantages are gained. Most important is that the potatoes are properly cooked yet stickiness is kept at a minimum. As a result, subsequent operations are simplified and take less time. For example, conditioning under identical treatment will require one-half or less time than potatoes cooked by conventional methods. Also, the potato material can be readily subdivided without cell damage—thus to produce products free from stickiness or reconstitution. Moreover, browning or development of off-flavors during cooking is avoided. Thus it has been found that when potatoes are cooked under conditions falling below curve AB, the potatoes contain many uncooked particles and when the material is processed to form dehydrated granules, so much mechanical force must be applied to subdivide the uncooked particles that cell rupture is extensive and the product on reconstitution forms a sticky mass. On the other hand, when the cooking conditions fall above curve CD, (a) stickiness or (b) discoloration and development of off-flavors are encountered, depending on the temperature. Thus at the higher temperature ranges, about 200–212° F., cooking above curve CD leads to stickiness so that long conditioning times are required and subdivision without cell rupture is difficult to accomplish. At lower temperature ranges, about 175–195° F., cooking above curve CD leads to discoloration (browning) and development of unnatural, undesirable flavors.

Other advantages accruing from the use of the special cooking conditions are:

Uniform cooking throughout the potato pieces is attained with the result that the dehydrated products eventually produced are uniform in rehydration characteristics.

The special cooking conditions enable the production of potato granules which may be reconstituted with water ranging in temperature from room temperature to boiling and still they form a reconstituted mash of desirable mealy texture. Reconstitution with water at room temperature is a significant advantage in the manufacture of frozen, ready-cooked dinners. In putting up these dinners, containing a portion of mashed potatoes prepared from dehydrated granules, it is desirable to use room temperature water for the reconstitution to eliminate need for cooling prior to freezing. On the other hand, the ability to reconstitute with boiling water is a desirable property of potato granules in home or institutional use to provide a piping hot dish of mashed potatoes.

Also, dehydrated granules prepared from potatoes cooked in this special manner will provide a greater volume of mashed potatoes on reconstitution than will the same weight of conventional granules.

In applying the special cooking method, it is preferred to use a temperature of about 190° F. for the reason that at this temperature there is a greater leeway than at higher temperatures between minimum and maximum cooking times. Thereby the process can be more accurately controlled and variations due to differences in composition of different batches of potatoes, localized or temporary changes in the cooking medium, and the like, are canceled or at least their effect is minimized. Also, at the lower temperature range 175–190° F. the thickness of the potato slices which are to be cooked is immaterial, and can be as much as one or two inches, or moderate-sized potatoes can even be cooked whole, without appreciable non-uniformity of cooking throughout the material. At higher temperatures it becomes more important that slice thickness or piece size be small enough to avoid non-uniformity of cooking whereby the center of the piece or slice is undercooked while the surface is overcooked, with resultant loss of the beneficial effects of the new cooking procedure. Thus, at the highest cooking temperatures, of about 205–212° F., it is preferred to use slices up to and including about one-half inch, or other pieces with similar ratio of surface area to volume, for example, dice up to and including one inch on a side.

The cooking, carried out under the conditions of time and temperature as explained above, is generally effected by immersing the potato slices in a bath of water at the selected temperatures. Another plan is to subject the potato slices to a current of steam or other hot gases. For cooking at temperatures below 212° F., mixtures of steam and air proportioned to provide the desired temperature, are useful. It is further to be noted that in this method the potatoes are given a single cook at prescribed conditions of time and temperature. This procedure is in contrast to methods which have been previously advocated wherein potatoes are given a pre-cook at relatively low temperatures followed by a cook at boiling temperatures.

The special cooking method is further described and claimed in the copending application of C. E. Hendel, G. K. Notter, and R. M. Reeve Serial No. 15,508, filed March 16, 1960.

The invention is further demonstrated by the following illustrative examples.

In the examples, products were tested for blue value index by the method of Mullins et al. (Food Technology, vol 9, p. 393) on a basis of 2½ grams of dry solids. This determination furnishes a measure of release of free starch from the cells and a higher value denotes more free starch. In another test, moisture absorption of the products was measured by a modification of the method of Potter (Jour. Ag. and Food Chem., vol. 2, p. 516; 1954). This test determines the volume of reconstituted mashed potatoes formed per unit weight of dried granules. In this case a higher value indicates a superior product as more mashed potatoes are formed from a standard amount of dry material.

Example I

Idaho Russet Burbank potatoes were washed, peeled, trimmed, and cut in three-fourths inch thick slices.

The slices were dipped five minutes in a 1.25% aqueous solution of sodium bisulphite. The slices were then cooked 60 minutes in a mixture of air and steam having a temperature of 190° F.

The cooked potatoes were mashed by pressing through a one-half inch mesh screen, then blended in a planetary-type mixer for one minute with 10% of their weight of water containing 0.6 gram of sodium bisulphite per ten pounds of potatoes.

The potato mash was then partially dried on a single drum drier—drum temperature 250° F., speed of drum 2.5 r.p.m. The partially-dried mash had a moisture content of 56.5%.

The partially-dried mash was then conditioned. To this end, it was placed in a trough granulator as depicted in FIGS. 2 and 3. The shaft was rotated (2 r.p.m.) continuously during addition of the mash (30 minutes), then for the next hour the shaft was rotated five minutes out of each 15-minute period. During this operation the temperature of the mash decreased from about 125° F. to about 65° F. The mash was then friable and ready for the beginning of granulation. It was near the upper limit of the critical moisture region referred to above.

To granulate the conditioned mash, it was left in the trough granulator and the shaft was operated continuously (2 r.p.m.) for one hour while air at room temperature was blown through the device. Moisture content of the material was reduced to 50.5%. The material was near the middle of its critical moisture region. It was now granulated well enough that the rate of drying could be increased without resulting in an excessive proportion of coarse dried product.

The potato material—still in the trough granulator and with the collector attached as in FIG. 4—was subjected to a current of air at 200° F. while the speed of the shaft was increased to 5 r.p.m. In about 30 minutes, 94% of the dried granules were received in the collector. This product containing 20% moisture was then finish-dried in a fluidized bed drier to produce granules of 6% moisture content. The product had a blue value index of 17, indicative of very slight cell damage. Bulk density of the product was 0.92 gram/cc.; moisture absorption was 5.7 cc. of reconstituted mash per gram of product. A portion of the product on reconstitution with boiling water formed mashed potatoes of a desirable mealy texture free from both pastiness and graininess.

Example II

A quantity of Idaho Russet Burbank potatoes was washed, peeled, trimmed, sliced, and given a five-minute dip in 1.25% aqueous sodium bisulphite solution. The material was then divided into several lots which were cooked under different time and temperature conditions set forth below.

Following cooking, each lot was converted into granules by the same method. This method involved these steps:

The cooked potatoes were mashed by pressing through a one-half inch mesh screen, then blended in a planetary-type mixer for one minute with 10% of their weight of water containing 0.6 gram of sodium bisulphite solution per ten pounds of potatoes.

The potato mash was then partially dried on a single drum drier—drum temperature 250° F., speed of drum 3.5 r.p.m. The partially-dried mash had a moisture content of about 55%.

The partially-dried mash was then conditioned. To this end, it was placed in a trough granulator as depicted in FIGS. 2 and 3. The shaft was rotated (2 r.p.m.) continuously during addition of the mash (30 minutes), then the shaft was rotated five minutes out of each 20-minute period. In about 90 minutes the temperature of the mash decreased from about 125° F. to about 65° F. The conditioning was continued until the potato material lost its doughy texture and become friable. The time required for this result varied with the different lots as indicated in the table below.

To granulate the conditioned mash, it was left in the trough granulator and the shaft was operated continuously for one hour while air at room temperature was blown through the device. Moisture content of the material was reduced to about 50%.

The potato material—still in the trough granulator and with the collector attached as in FIG. 4—was subjected to a current of air at 200° F. while the speed of the shaft was increased to 5 r.p.m. The product received in the collector, containing about 20% moisture, was finish-dried in a fluidized bed drier to produce granules of about 6% moisture content.

The conditions used and the results obtained are tabulated below:

| Lot | Size of raw potatoes, Inches | Cooking temp., °F. | Cooking time, Min. | Conditioning time required, Hrs. | Blue value index of granules | Texture on reconstitution with water at 170° F. | Texture on reconstitution with water at 212° F. |
|---|---|---|---|---|---|---|---|
| A-1 | ½ x ½ x ½ | 212 (steam) | 7 | 3 | 49 | Excellent | Excellent. |
| A-2 | ½ x ½ x ½ | do | 9 | 3 | 59 | do | Do. |
| B | ½ (slices) | 200 (steam and air) | 20 | 2.5 | 45 | do | Do. |
| C-1 | ¾ (slices) | 190 (steam and air) | 60 | 2 | 17 | do | Do. |
| C-2 | do | do | 150 | 2 | 32 | do | Do. |

Example III

Idaho Russet Burbank potatoes were washed, peeled, trimmed, and cut into ¾ inch thick slices.

The potato slices were dipped five minutes in a 1.25% aqueous solution of sodium bisulphite, then cooked for 60 minutes in a steam-air mixture at 190° F.

The cooked potatoes were mashed by pressing through a 2-mesh screen and blended in a planetary-type mixer for one minute while adding an aqueous solution, equal to 10% of the weight of the potatoes, containing 0.6 gram of sodium bisulphite and 4.5 grams of glycerol monostearate per ten pounds of potatoes. The glycerol monostearate was added to the aqueous solution as a 5% emulsion, that was prepared by slowly adding 15 grams of it to 300 grams of water at about 190° F., while the water was being stirred very rapidly. The rapid stirring was continued until the temperature had fallen to 110° F. (about 10 minutes). A stable emulsion was thus formed.

The potato mash was then partially dried on a single drum drier—drum temperature 250° F., drum speed 2.5 r.p.m. Moisture content of the partially-dried mash was 66%.

The partially-dried mash as formed was placed on a moving belt and subjected to mild shear and mild compression forces by a rotating blade contacting the mash. The partially dried mash was received onto the belt in a period of 30 minutes. The belt and accompanying mechanism was then placed in a room maintained at 30° F. for cooling and conditioning. The mash was held in this room 30 minutes, its temperature dropping to 35° F., while it was contacted with the blades rotating at about 60 r.p.m. to form a friable material.

The potato material was then placed in the trough granulator as shown in FIGS. 2 and 3. The shaft was rotated at 5 r.p.m. while air at 150° F. was blown through the device. Moisture content of the potato material at the beginning was 62%; after 10 minutes, 57%; after 30 minutes, 48%; and after 40 minutes, 36%. At the end of the 40-minute period the potato material was well granulated and the air temperature was increased to 250° F. to finish drying. Also, the collector was attached as shown in FIG. 4. In 20 minutes 96% of the dried granules were received in the collector. This product having a moisture content of 26% was finish-dried in a fluidized-bed drier to produce granules of 6% moisture content.

*Example IV*

Idaho Russet Burbank potatoes were washed, peeled, trimmed, cut into ¾ inch slices, soaked five minutes in 1.25% aqueous sodium bisulphite solution, then cooked for 60 minutes in a steam-air mixture at 190° F.

The cooked potatoes were riced through a 2-mesh screen and mashed for one-half minute in a planetary-type mixer while adding 0.6 gram of sodium bisulphite per ten pounds of mash and water equal to 5% of the weight of the mash.

The mashed potatoes were partially dried on a single drum drier—drum temperature 240° F., drum speed 5 r.p.m. The product contained 72% moisture.

The mash was conditioned by spreading on trays in a layer about one inch deep and freezing at 10° F. Freezing time was about three hours.

The frozen material was then placed in the granulator device of FIGS. 2 and 3 and the shaft was operated (2 r.p.m.) while air at 200° F. was blown through the device. In 25 minutes the mash was thawed—it had moisture content of 67%.

The thawed mash was transferred to the device of FIG. 5 and the granulating blades were rotated at about 100 r.p.m. while air at 250° F. was blown up through the screen. The potato material was recirculated ten times through the device over a period of 30 minutes until the product contained 21.5% moisture. This product was finish-dried in a fluidized-bed drier to yield the final product having 5% moisture, blue value of 24, and moisture absorption of 5.8 ml. reconstituted mash per gram of dry product.

Having thus described the invention, what is claimed is:

1. A process for preparing dehydrated potatoes which comprises subjecting cooked potato mash to repeated mild compression and mild shear forces, said forces being of sufficient intensity to separate individual cells from one another but insufficient to cause any substantial rupture of individual cells, simultaneously subjecting the mash to drying conditions, the said forces being repeatedly applied while the moisture content of the mash is reduced from about 50% down to 35% and until the mash is converted into a bulky, loosely-coherent mass of unicellular particles and small aggregates of unicellular particles, and subjecting the resulting material to final drying.

2. A process for preparing dehydrated potatoes which comprises subjecting cooked potato mash to repeated mild compression and mild shear forces, said forces being of sufficient intensity to separate individual cells from one another but insufficient to cause any substantial rupture of individual cells, simultaneously contacting the mash with a stream of air to reduce the moisture content of the mash, the said forces being repeatedly applied concurrently with application of the air stream while the moisture content of the mash is reduced from about 50% down to 35% and until the mash is converted into a bulky, loosely-coherent mass of unicellular particles and small aggregates of unicellular particles, and subjecting the resuting material to final drying.

3. A process for preparing dehydrated potatoes which comprises cooking potatoes, mashing the cooked potatoes, partially dehydrating the mash to a moisture content about from 50 to 75%, conditioning the mash until it loses its doughy texture, subdividing the conditioned mash by subjecting it to repeated mild compression and mild shear forces, said forces being of sufficient intensity to separate individual cells from one another but insufficient to cause any substantial rupture of individual cells, simultaneously contacting the mash with a stream of air to reduce the moisture content of the mash, the said forces being repeatedly applied concurrently with application of the air stream while the moisture content of the mash is reduced from about 50% down to about 35% and until the mash is converted into a bulky, loosely-coherent mass of unicellular particles and small aggregates of unicellular particles and subjecting the resulting material to final drying.

4. The process of claim 3 wherein the conditioning is effected while subjecting the potato material to repeated mild compression and mild shear forces, said forces being of sufficient intensity to separate individual cells but insufficient to cause any substantial rupture of individual cells.

5. The process of claim 3 wherein the final drying is effected while subjecting the potato material to repeated mild compression and mild shear forces, said forces being of sufficient intensity to separate individual cells but insufficient to cause any substantial rupture of individual cells.

References Cited in the file of this patent

UNITED STATES PATENTS

| | | |
|---|---|---|
| 611,017 | Newmann | Sept. 20, 1898 |
| 2,959,487 | Notter et al. | Nov. 8, 1960 |